US008453679B2

(12) United States Patent
Rüb

(10) Patent No.: US 8,453,679 B2

(45) Date of Patent: Jun. 4, 2013

(54) HYDRAULIC VALVE DEVICE

(75) Inventor: Winfried Rüb, Waldshut-Tiengen (DE)

(73) Assignee: Hydac Filtertechnik GmbH, Sulzback/Saar (DE)

( * ) Notice: Subject to any disclaimer, the term of this patent is extended or adjusted under 35 U.S.C. 154(b) by 414 days.

(21) Appl. No.: 12/733,705

(22) PCT Filed: Sep. 17, 2008

(86) PCT No.: PCT/EP2008/007749

§ 371 (c)(1), (2), (4) Date: Mar. 16, 2010

(87) PCT Pub. No.: WO2009/062563

PCT Pub. Date: May 22, 2009

(65) Prior Publication Data

US 2010/0206413 A1 Aug. 19, 2010

(30) Foreign Application Priority Data

Nov. 14, 2007 (DE) ......................... 10 2007 054 138

(51) Int. Cl.
*F16K 11/07* (2006.01)

(52) U.S. Cl.
USPC ............... 137/625.68; 137/625.6; 137/625.66

(58) Field of Classification Search
USPC .................. 137/596, 596.12, 596.13, 596.14, 137/596.16, 596.17, 596.18, 625.6, 625.66, 137/625.68
See application file for complete search history.

(56) References Cited

U.S. PATENT DOCUMENTS 2,939,429 A * 6/1960 Charlson ....................... 137/596
3,177,897 A * 4/1965 McAfee, Jr. .................. 137/881

FOREIGN PATENT DOCUMENTS

| | | | |
|---|---|---|---|
| DE | 1 648 012 | B1 | 5/1972 |
| DE | 199 19 014 | A1 | 11/2000 |
| DE | 10 2005 005 927 | A1 | 8/2006 |
| DE | 10 2005 050 169 | A1 | 12/2006 |
| WO | WO 2006/105765 | A1 | 10/2006 |

* cited by examiner

*Primary Examiner* — Craig Schneider

(74) *Attorney, Agent, or Firm* — Roylance, Abrams, Berdo and Goodman LLP

(57) ABSTRACT

A hydraulic valve device, especially in the form of at least one load sensing valve, includes a valve housing (10), a control slide (12) longitudinally movable in the housing and controlling a fluid connection arrangement (14). The fluid connection arrangement includes at least one control pressure line ($P_{ST}$) and at least one supply pressure line (Y). At least for a load sensing connection (LS), a pocket-type channel (18) is arranged between the valve housing (10) and the control slide (12), as well as for a control pressure line ($P_{ST}$) and a supply pressure line (Y). This arrangement enables the available ring channel of the load sensing message chain to be used on axial point of the control slide axle, reducing cost and space.

21 Claims, 4 Drawing Sheets

HYDRAULIC VALVE DEVICE

FIELD OF THE INVENTION

The invention relates to a hydraulic valve device, in particular in the form of at least one LS directional valve, with a valve housing and a control slide moveable therein in the longitudinal direction for triggering a fluid connection arrangement including at least one inlet connection P, one return connection R, one load sensing connection LS, one working connection A, B, at least one control pressure line $P_{ST}$ and at least one supply pressure line Y.

BACKGROUND OF THE INVENTION

These hydraulic valve devices are known in a plurality of embodiments. For example, DE 199 19 014 A1 describes a hydraulic valve with interlocking and floating functions, with a housing bore having a switching channel therein randomly supplied with pressure discharges. On both sides of the housing, a respective connecting channel is connectable via a control valve to a pressure source and a tank. On both sides outside of the housing, one motor channel at a time discharges for connection of a hydraulic motor. In the housing are two pistons form a separating chamber between them connecting to the switching channel. On both sides outside of the switching channel one spring loaded blocking valve at a time is located. Under the influence of pressure in the adjacent connecting channel or as a result of axial displacement of the adjacent piston, the blocking valve opens to the pertinent motor channel. Blocking valves have closure pieces that are guided in the indicated bore and that border on the side facing away from the valve seat. One spring chamber at a time contains a blocking valve spring. Each spring chamber is depressurized by an auxiliary valve that opens by axial displacement of the adjacent piston toward a tank connection T. With the known solution, when the spring chamber is depressurized as the auxiliary valve opens by the adjacent piston, the closure piece of the pertinent blocking valve opens reliably and completely.

WO 2006/105765 A1 discloses an LS directional valve with two valve slides coaxially disposed relative to one another and guided in a valve bore. The valve slides are tensioned toward one another in a base position via a centering spring arrangement, and can be moved apart from one another for setting a specific slide position out of the base position in which two adjacent face surfaces of the valve slide adjoin one another or are adjacent to one another without interposition of elastic support elements that can be moved jointly for setting other operating positions. The face surfaces for movement into the slide position can be exposed to a common control pressure also acting on the backward control surfaces of the valve slides. Those central surfaces are made with a smaller active surface and are located away from the face surfaces. In the known solution, setting into a predetermined slide position takes place based on the area difference. The face surfaces and the control surfaces are exposed to the same control pressure so that the channel duct is simplified compared to conventional solutions. Electrical components, for example, in the form of the plunger of an electromagnet, acting directly on the valve slide, are not necessary.

SUMMARY OF THE INVENTION

An object of the invention is to provide a structurally simple valve device, which, viewed particularly in the direction of the control slide axis, has a small structure and manages with few deployable components and is thus especially reliable.

This object is basically achieved by a valve device having at least for each of a load sensing connection LS, a control pressure line $P_{ST}$ and a supply pressure line Y, a pocket-like channel is between the valve housing and control slide. At an axial position of the control slide axis, the existing annular channel of the load sensing reporting chain can additionally be used. This arrangement helps reduce the components used within the valve device and saves installation space. As a result of the small number of operating components, the solution according to the invention is also less susceptible to faults and wear. In this respect reliable and long-lasting operation is ensured.

In one especially preferred embodiment of the valve device according to the invention, the annular channel in the housing is divided into three pairs of pockets independent of one another and symmetrically distributed on the periphery relative to the longitudinal axis of the control slide. The first pair of pockets relays the LS pressure from the control slide into the LS reporting chain in the valve housing. The second pair of pockets is continuously connected to the control pressure line $P_{ST}$. The third pair of pockets is connected to the supply pressure line Y and can be connected via the possible control slide stroke to the second pair of pockets. This space-saving arrangement allows a plurality of hydraulic functions to be performed. While in the known solutions, the load sensing connection LS, the control pressure line $P_{ST}$, and the supply pressure line Y in the valve housing of the control slide are routed separately and perform their functions spatially separately from one another, these functional groups are combined at one location in the valve housing at the transition site to the control slide. This combination also benefits short switching and actuating times. Due to the laminar flow configuration within the pocket-like channels, a uniform, reliable fluid flow is ensured.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure and are schematic and not to scale.

DETAILED DESCRIPTION OF THE INVENTION

Figure 1:
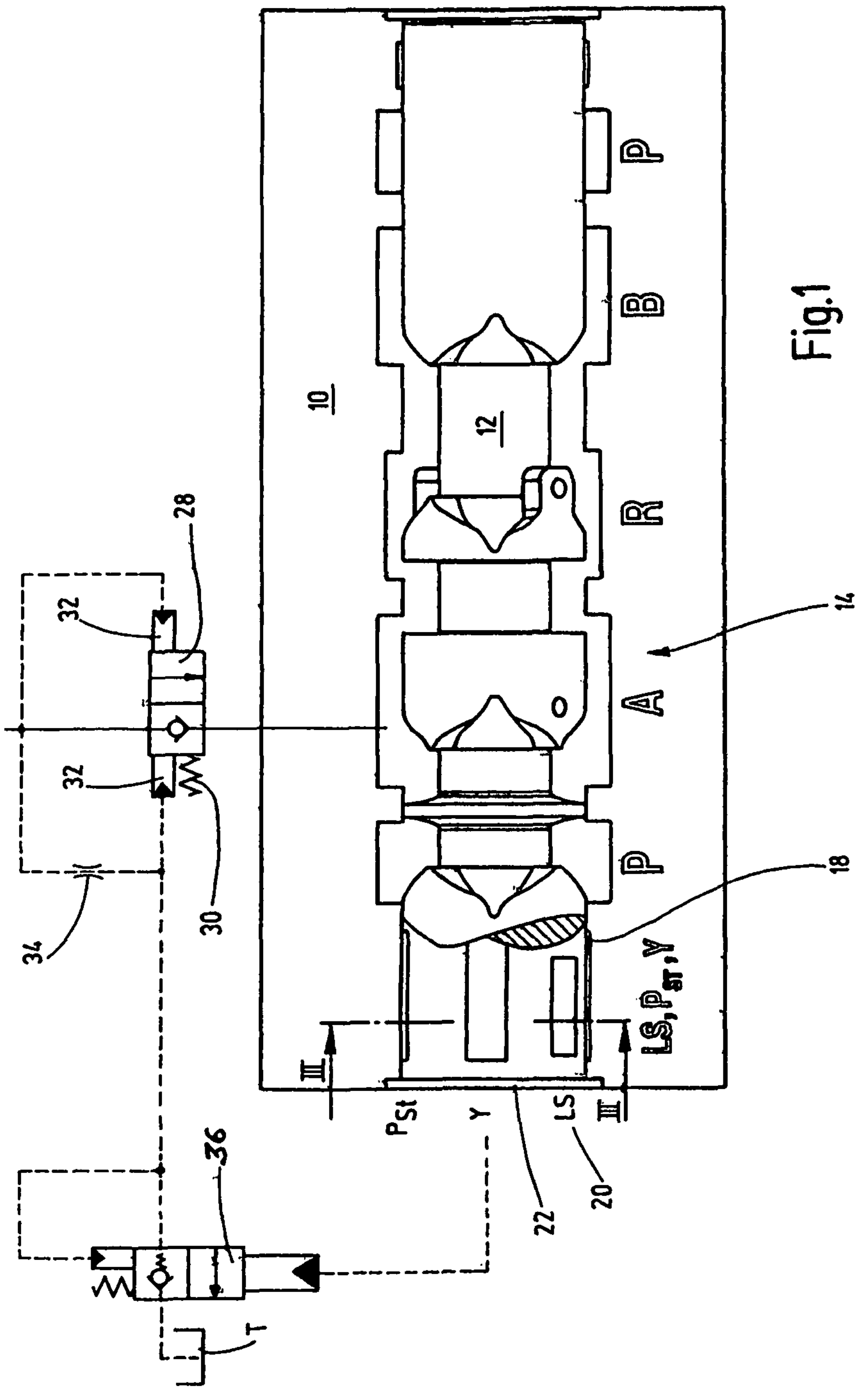
FIG. 1 is a schematic diagram with a side elevational view in section of a hydraulic valve device according to a first exemplary embodiment of the invention with the pertinent control slide including other hydraulic operating components.
Figure 2:
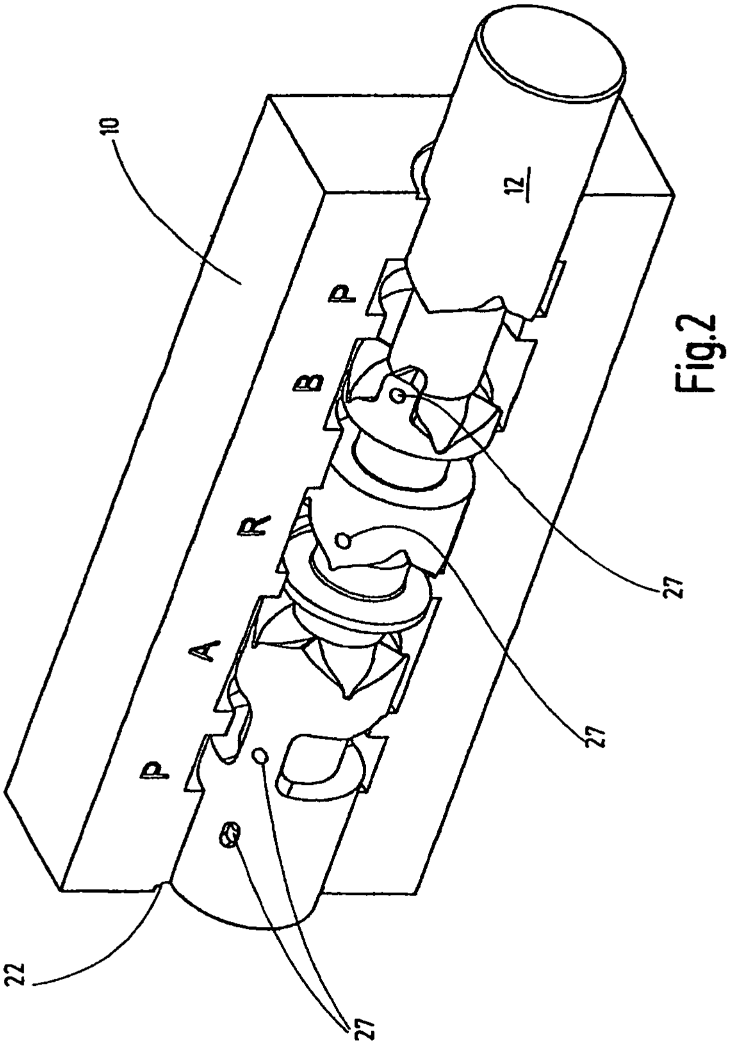
FIG. 2 is a perspective view in section of the valve device of FIG. 1 having the valve housing with the integrated control slide and without other operating components.

The hydraulic valve device according to a first exemplary embodiment of the invention is shown in FIG. 1 in its basic structure. The FIG. 1 illustration is simplified in that it does not detail the other valve components as are conventionally included in these hydraulic valve devices and as are shown, for example, in DE 199 19 014 A1 and WO 2006/105765 A1. The valve device is designed, in particular, as an LS directional valve with a valve housing 10 and a control slide 12 located therein. Control slide 12 can move in the longitudinal direction for triggering a fluid connection arrangement 14. Valve arrangement 14 includes at least one inlet connection P, one return connection R, one load sensing connection LS, one working connection A, B, and with a control pressure line $P_{ST}$ and a supply pressure line Y.

In the illustrated first embodiment, the inlet connection P is present twice and forms the conventional pressure supply connection, i.e., to a hydraulic pump (not shown) supplying the valve device with a definable amount of pressurized fluid. The two working connections A, B, for example, are dynamically connected to carry fluid with a working means of a hydraulic device (not shown), for example, in the form of a hydraulic steering or working cylinder, to allow this hydraulic cylinder to be extended and retracted for operational activity.

As is especially apparent from the left half of FIG. 1, for the load sensing connection LS, for the control pressure line $P_{ST}$ the pressure supply line Y, at least one pocket-shaped channel 18 is between the valve housing 10 and the control slide 12. Channel or duct 18 extends, in particular in the valve housing 10, as shown in the sectional view of FIG. 3. The pocket-shaped channels 18 are arranged around the control slide 12 at uniform radial distances, viewed in the indicated cross section. The pocket-shaped channels are divided into three pairs of pockets which are independent of one another. The first pair of pockets relay the LS pressure from the control slide 12 into the LS reporting chain 20 in the housing. The second pair of pockets is permanently connected to the control pressure line $P_{ST}$ (control oil circuit). The third pair of pockets relays the Y fluid pressure via the supply line Y and can be connected to the second pair of pockets by the control slide stroke.

For all pairs of pockets, for reasons of symmetry, each pair partner is diametrically opposite the other partner, relative to the longitudinal axis of the control slide 12, in the adjacent valve housing 10. Only one pocket at a time always has a relay connection into the housing 10. For symmetrical pressure loading of the control slide 12, pressure equalization connections from the connected housing pocket of one pair to the opposite housing pocket forms only one sealed pressure chamber, as described below. The pressure equalization connections therefore always connect only one pair of pockets to one another without crossing. The orientation of the pressure equalization connections in the control slide 12 to the indicated pairs of housing pockets in the form of longitudinal channels 18 is maintained by a mechanical anti-rotation element (not shown) of the slide 12 to the housing 10.

FIG. 1 shows that the pocket-shaped channels 18 are arranged parallel to the displacement axis of the control slide 12 and are routed as longitudinal channels in the valve housing 10. Specifically, viewed three-dimensionally channels 18 are between the inlet connection P at the left FIG. 1 and the left chamber 22 for the trigger pressure of the control slide to move it into the right-hand position. The trigger chamber is made pressure-tight by a trigger head (not shown). In the float position of the control slide shown in FIG. 1, the left trigger chamber is unpressurized, and the right chamber is exposed to the trigger pressure. The illustrated pockets for pressures LS, $P_{ST}$, and Y are made in the wall of the control slide bore. For the sake of simplicity, as viewed in FIG. 1, to the left, the projection of the control slide piston in the illustrated float position is omitted. As a rule, the control slide projects by roughly ⅓ of the length measured between the fluid supply site 22 and the pressure supply connection P on the left side with the same peripheral diameter.

Figure 4:
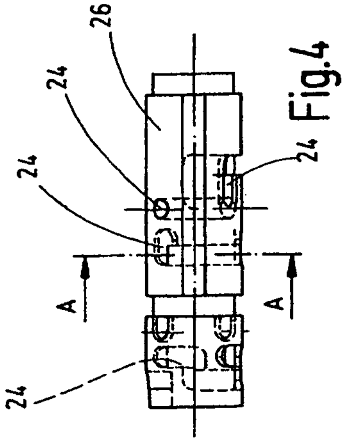
FIG. 4 is a side elevational view of the inner part of the control slide of FIGS. 1 to 3, with its equalization channels.
Figure 5:
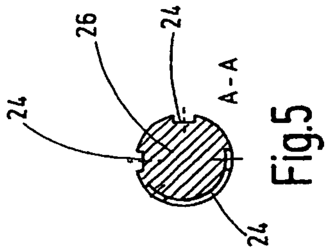
FIG. 5 is an end elevational view of the control slide in section taken along line A-A in FIG. 4.

As shown in FIG. 4, in the control slide 12, each pocket-shaped longitudinal channel 18 is assigned an equalization channel 24. The equalization channels are separated fluid-tight from one another and undertake pressure equalization for each assignable pair of pockets. At least for some of the equalization channels 24, they differ from one another in terms of their fluid accommodation volume, for example, due to the length of the channel duct. Pressure equalization of the pairs of pockets in the form of longitudinal channels 18 with one another takes place first by radial bores as a type of equalization channel 24 in the control slide 12. These bores, however, should not cross so as to carry fluid. Otherwise, separate pressure levels cannot be sealed in the individual pocket-shaped channels 18. Within the control slide 12, therefore, as shown in FIG. 4 a type of labyrinth pin 26 is inserted whose jacket surface bears the equalization channels 24 (compare FIG. 6) to enable these noncrossing connections at all. The radial pressure equalization bores in the control slide 12 each end on the jacket surface of the labyrinth pin 26 except for the load sensing bores $LS_A$. They run directly through a vertical labyrinth duct in the labyrinth pin 26 from one side directly to the diametrically opposite other side relative to the longitudinal axis of the pin 26. The bores of the load sensing line $LS_B$ in turn end at an annular groove and pass between the through holes via two longitudinal grooves. Additional details of the equalization channel duct 24 shown in FIG. 6. The otherwise cylindrical labyrinth pin 26 is routed in a cylindrical internal recess of the control slide 12 provided to the outside with load sensing and load reporting connections 27 for the working connections A, B.

Figure 3:
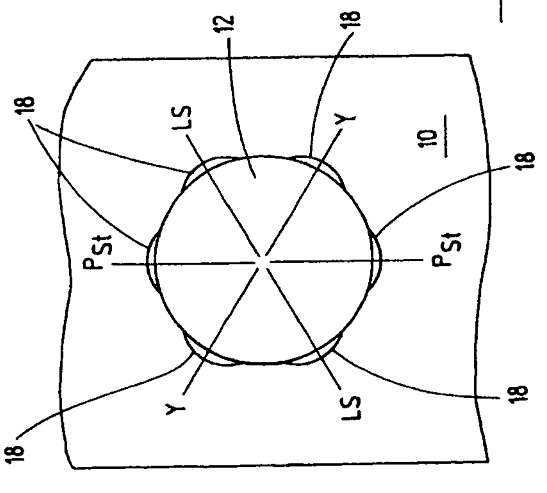
FIG. 3 is an end elevational view in section taken along line III-III in FIG. 1, only through the valve housing and not through the control slide.

The cross section shown in FIG. 3, in terms of its axial position, is at the level of the pockets $P_{ST}$, LS and Y. The indicated pockets in the form of longitudinal channels 18 can be produced by metal cutting by a radially dipping cutter. As already described, two opposite pockets at a time as one pair of pockets have the same pressure level. One of the pockets in the form of a longitudinal channel 18 of one pair has a line connection into the housing 10. For example, the control oil line $P_{ST}$ could be connected overhead, the Y-connection at 10 o'clock and the LS connection at 8 o'clock, if a clock face were applied, figuratively speaking, to FIG. 3.

FIG. 1 is further explained below to the extent that additional hydraulic or fluid components are connected to the valve device. Between the control slide 12 and the working connection A in the direction of the hydraulic consumer, is a seat-tight check valve 28 is held by a compression spring 30 in the closed position, as shown in FIG. 1. Two additional control units 32 in the form of pressure-configured actuation means or actuators can affect the switching process for the check valve 28. The spring side of the check valve 28 is permanently connected via a throttle 34 to the load pressure of the working connection A. The other hydraulic functional component is a pilot valve 36 that can be opened by a Y-switching pressure in the pertinent pressure supply line Y. If the indicated Y pressure is switched through by the control slide 12, the Y pressure acts on the large opening surface against the load pressure on a small closing surface. According to the design, the opening force from Y and the opening surface exceed the maximum closing force. When the pilot valve 36 is opened, a continuous control oil flow then flows from the load of the hydraulic consumer on the working connection A via the throttle 34 and via the pilot valve 36 into a tank connection T. On the throttle 34, such a high pressure occurs that the spring side of the seat-tight check valve 28 drops to a pressure level near the tank pressure. Now the load pressure on the opposite side of the spring can overcome the resulting force from it and the low pressure force, and can lift the seat piston (not shown) as part of the hydraulic consumer.

The control slide 12 is shown in FIG. 1 in the float position in which the inlet connection P is blocked and the working connections A and B are connected to the return R. The opening pressure Y, derived from the control pressure $P_{ST}$, in this position is switched through to the pilot valve 36 and unlocks the pilot valve 36. In FIG. 1, however, for the sake of simplicity, the pilot valve 36 and the check valve 28 are shown in the closed position. The opening pressure Y can be selectively produced for a pilot-operated check valve on connection A or B or for both. Furthermore, it is possible to integrate at least the pilot-operated check valve 28 into the slide axis to save space. The control slide 12 could have integrated switching or proportional valves precontrolled with the pressures generated outside the control axis or vice versa. The valves integrated in the control slide could route a control pressure into the housing 10 without lengthening of the valve axis and increasing the overall length of the valve device in the cases described here.

In addition, with the hydraulic valve device, mechanical emergency actuation is possible by unblocking attainable by the movement of the control slide 12. To prevent friction forces and wear, a mechanical ramp solution located on the slide for striking the pilot plunger of the check valve is ruled out. Rather, the control oil pressure for supply of electroproportional pilot valves can be used to open the pilot valve 36 of the pilot-operated check valve 28.

Figure 6:
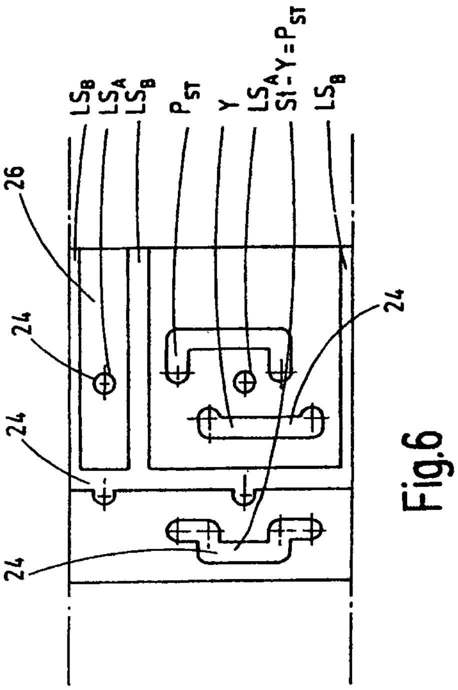
FIG. 6 is a plan view in the manner of an unrolled outer surface of the control slide of FIG. 4, with the equalization channels detailed.
Figure 7:
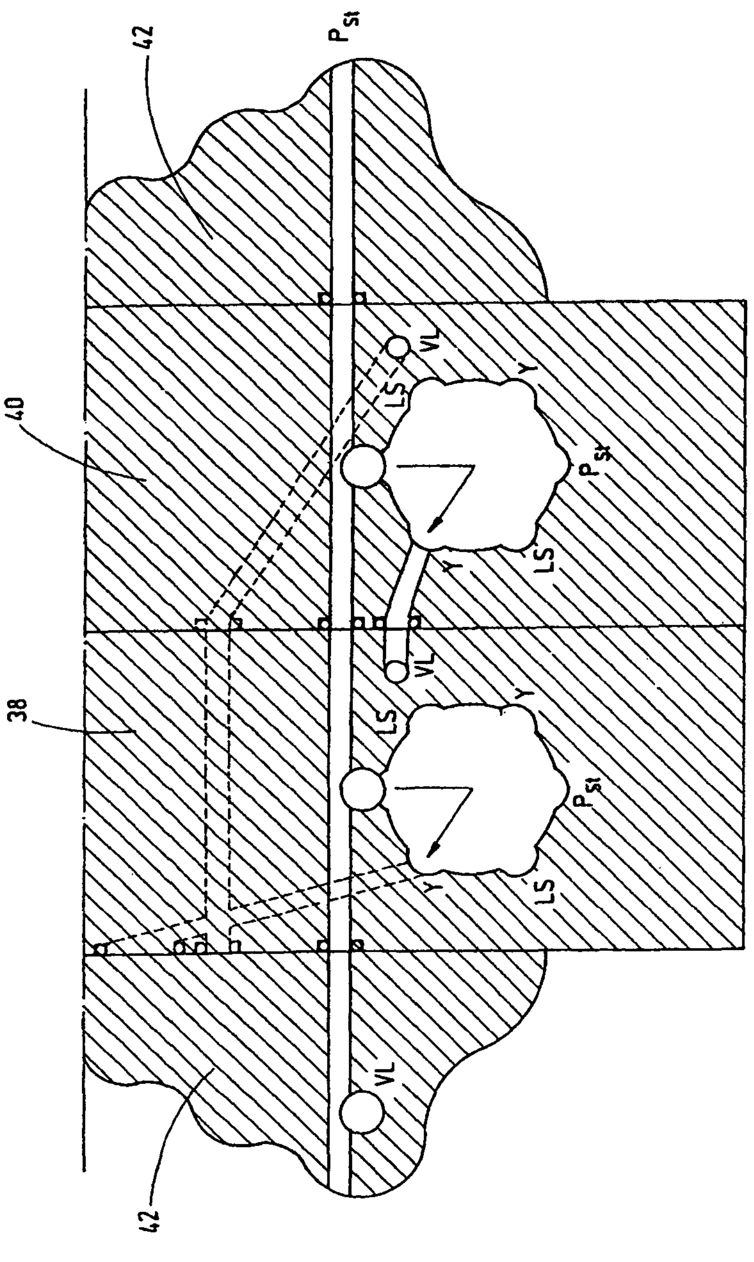
FIG. 7 is a schematic end elevational view of section hydraulic valve device with two adjacent directional valves according to a second exemplary embodiment of the invention.

The second exemplary embodiment shown in FIG. 7 is only explained to the extent that it differs essentially from the preceding embodiment. In particular, FIG. 7 shows the arrangement, viewed in cross section, of two directional valves as shown in FIG. 3 in a sectional construction for implementation of a safety circuit by the mutual release of the control oil supply for the left adjacent valve 38 and the right adjacent valve 40 that are both enclosed on the edge side by the standard valve components 42. Only in the neutral position of the left adjacent valve 38 is the control oil pressure $P_{ST}$ switched through to the supply line VL of the right adjacent valve 40. In the operating position, this connection is interrupted by the control slide stroke of the left adjacent valve 38. The electrohydraulic pilot valves of the right adjacent valve 40 cannot build up a trigger pressure. Even with electrical triggering of the right adjacent valve 40, it cannot be actuated as soon as the left adjacent valve 38 moves into the operating position. The same applies to the reverse trigger sequence. Here, in turn, the operation of the pairs of pockets is such that pressure equalization is implemented on the control slide 12 by the installed labyrinth pin 26 with the channel connections on its jacket surface (FIG. 6).

Therefore, the solution shown in FIG. 7 yields a safety circuit with two adjacent directional valves. The coaxial arrangement of the movable valve components (control slide 12) can completely obviate the necessity of using additional directional valve axles or externally mounted hydraulic line valves. Compared to electrical safety systems that may be fault-susceptible, reliable hydraulic interlocking becomes possible. With this solution, in particular, high safety requirements for forces can be met because, in addition to an electrical safety circuit, a redundant hydraulic safety circuit is provided.

While various embodiments have been chosen to illustrate the invention, it will be understood by those skilled in the art that various changes and modifications can be made therein without departing from the scope of the invention as defined in the appended claims.

What is claimed is:

1. A load sensing directional control valve, comprising:

a valve housing;

a control side having a longitudinal axis and being movable in said valve housing along said longitudinal axis; and a fluid connection arrangement controlled by movement of said control slide and including an inlet connection, a return connection, a load sensing connection, a working connection, a control pressure line and a supply pressure line, first, second and third pocket-shaped channels between said valve housing and said control slide forming said load sensing connection, said control pressure line, said supply pressure line, respectively and being arranged around said control slide at uniform radial distances in cross section.

2. A load sensing directional control valve according to claim 1 wherein said channels are arranged parallel to said longitudinal axis and comprise longitudinal channels in said valve housing.

3. A load sensing directional control valve according to claim 2 wherein said valve housing has a pressure space receiving an actuating pressure acting on said control slide; and said longitudinal channels are between said inlet connection and said pressure space in three dimensions.

4. A load sensing directional control valve according to claim 1 wherein each of said channels comprise first and second diametrically opposed parts relative to said longitudinal axis.

5. A load sensing directional control valve according to claim 4 wherein said control slide has first, second and third equalization channels equalizing pressure for said first, second and third channels, respectively, said equalization channels being separated fluid tight from one another, at least some of said equalization channels have different fluid accommodation volumes.

6. A load sensing directional control valve according to claim 5 wherein said control slide is restrained against rotational movement in said valve housing for consistent orientation of equalization connections formed by said pocket-shaped channels and said equalization channels relative to one another.

7. A load sensing directional control valve according to claim 1 wherein a check valve controlled by a pilot valve is connected to operate said control pressure line and is between a hydraulic consumer and said working connection.

8. A load sensing directional control valve according to claim 1 wherein at least two directional control valves are interconnected to one another in a sectional construction with respective pressure supply lines thereof connected to supply lines of at least one electrohydraulic pilot valve to implement a safety circuit.

9. A load sensing directional control valve, comprising:

a valve housing;

a control side having a longitudinal axis and being movable in said valve housing along said longitudinal axis;

a fluid connection arrangement controlled by movement of said control slide and including an inlet connection, a return connection, a load sensing connection, a working connection, a control pressure line and a supply pressure line, first, second and third pocket-shaped channels between said valve housing and said control slide forming said load sensing connection, said control pressure line, said supply pressure line, respectively; and a check valve controlled by a pilot valve being connected to operate said control pressure line and being between a hydraulic consumer and said working connection.

10. A load sensing directional control valve according to claim 9 wherein said channels are arranged parallel to said longitudinal axis and comprise longitudinal channels in said valve housing.

11. A load sensing directional control valve according to claim 10 wherein said valve housing has a pressure space receiving an actuating pressure acting on said control slide; and said longitudinal channels are between said inlet connection and said pressure space in three dimensions.

12. A load sensing directional control valve according to claim 9 wherein each of said channels comprise first and second diametrically opposed parts relative to said longitudinal axis.

13. A load sensing directional control valve according to claim 12 wherein said control slide has first, second and third equalization channels equalizing pressure for said first, second and third channels, respectively, said equalization channels being separated fluid tight from one another, at least some of said equalization channels have different fluid accommodation volumes.

14. A load sensing directional control valve according to claim 13 wherein said control slide is restrained against rotational movement in said valve housing for consistent orientation of equalization connections formed by said pocket-shaped channels and said equalization channels relative to one another.

15. A load sensing directional control valve according to claim 9 wherein at least two directional control valves are interconnected to one another in a sectional construction with respective pressure supply lines thereof connected to supply lines of at least one electrohydraulic pilot valve to implement a safety circuit.

16. A hydraulic valve arrangement, comprising:

first and second load sensing directional control valves interconnected to one another in a sectional construction, each load sensing direction control valve including a valve housing, a control side having a longitudinal axis and being movable in the respective valve housing along the respective longitudinal axis, and a fluid connection arrangement controlled by movement of the respective control slide and including an inlet connection, a return connection, a load sensing connection, a working connection, a control pressure line and a supply pressure line, first, second and third pocket-shaped channels between the respective valve housing and the respective control slide forming the respective load sensing connection, the respective control pressure line, the respective supply pressure line, respectively, the respective pressure supply lines connected to respective supply lines of at least one electrohydraulic pilot valve to implement a safety circuit.

17. A load sensing directional control valve according to claim 16 wherein said channels are arranged parallel to the respective longitudinal axis and comprise longitudinal channels in the respective valve housing.

18. A load sensing directional control valve according to claim 17 wherein each said valve housing has a pressure space receiving an actuating pressure acting on the respective control slide; and said longitudinal channels are between the respective inlet connection and the respective pressure space in three dimensions.

19. A load sensing directional control valve according to claim 16 wherein each of said channels comprise first and second diametrically opposed parts relative to the respective longitudinal axis.

20. A load sensing directional control valve according to claim 19 wherein each said control slide has first, second and third equalization channels equalizing pressure for the respective first, second and third channels, respectively, the respective equalization channels being separated fluid tight from one another, at least some of said equalization channels have different fluid accommodation volumes.

21. A load sensing directional control valve according to claim 20 wherein each said control slide is restrained against rotational movement in the respective valve housing for consistent orientation of equalization connections formed by the respective pocket-shaped channels and the respective equalization channels relative to one another.

* * * * *